Dec. 9, 1958    R. FERRER    2,863,515
VEHICLE PARKING DEVICE
Filed July 9, 1957    4 Sheets-Sheet 1
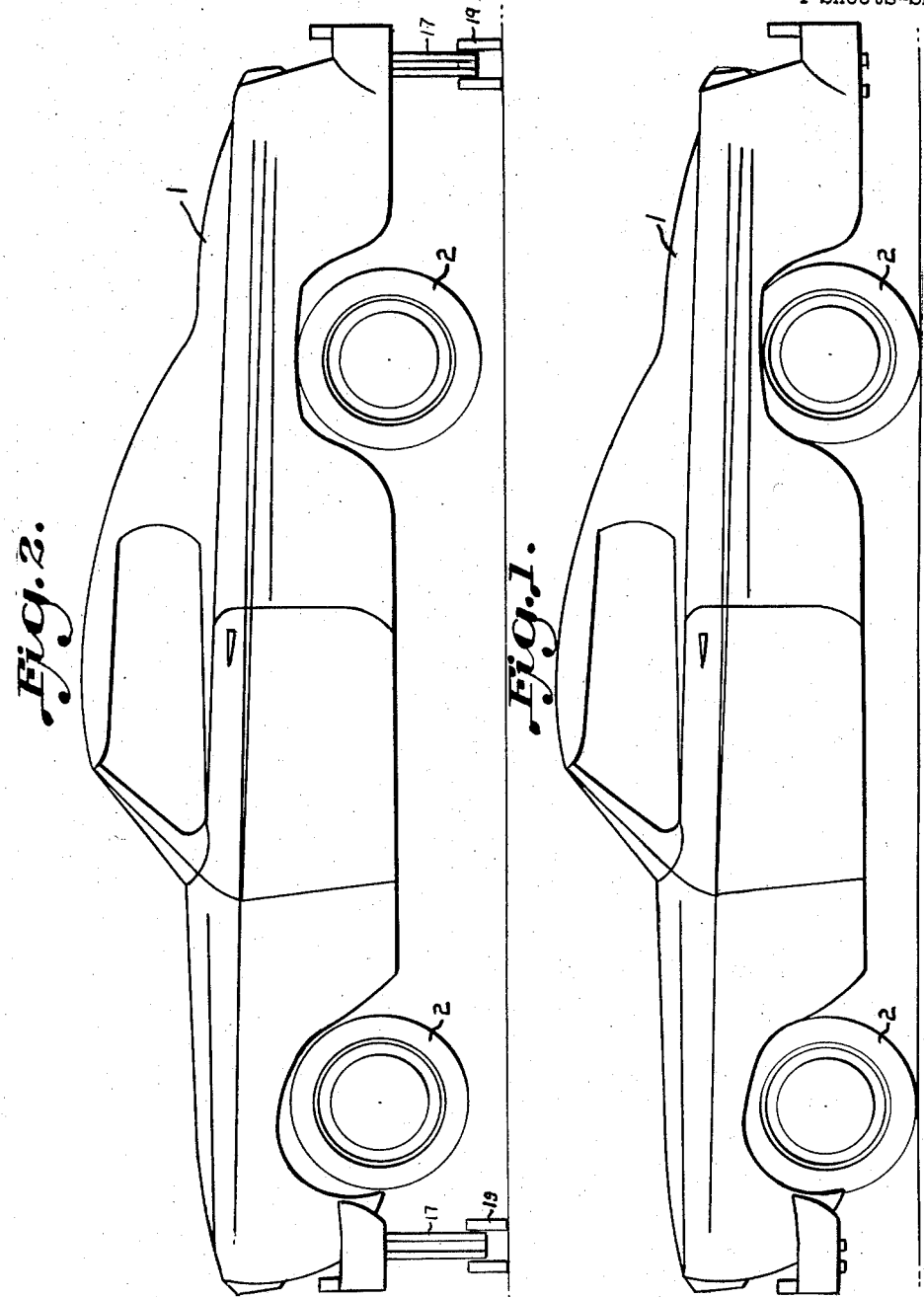
INVENTOR.
RAIMUNDO FERRER
BY Wenderoth, Lind and Ponack
ATTYS.

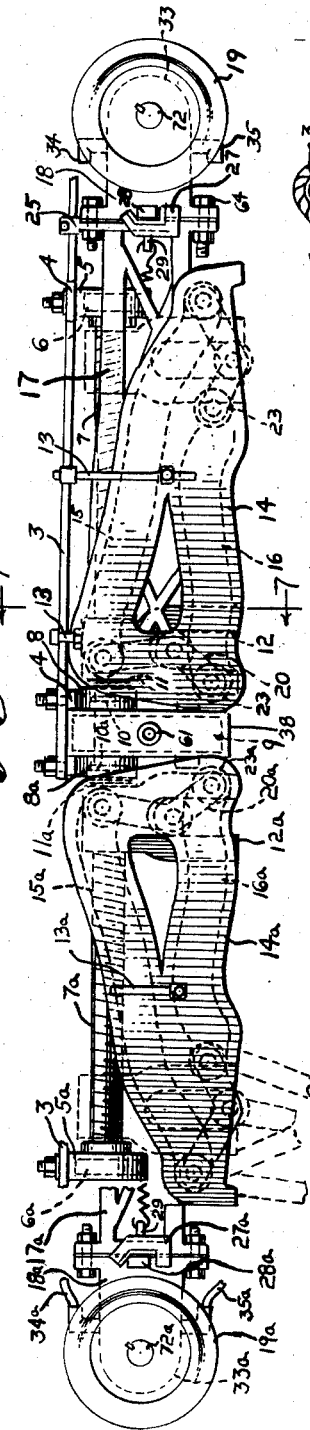

Dec. 9, 1958
R. FERRER
2,863,515
VEHICLE PARKING DEVICE
Filed July 9, 1957
4 Sheets-Sheet 3
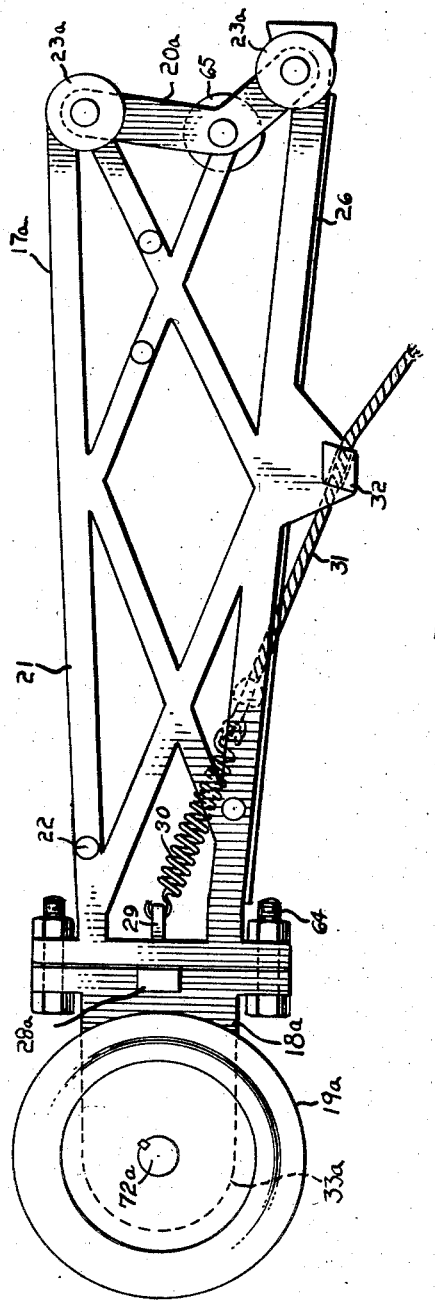
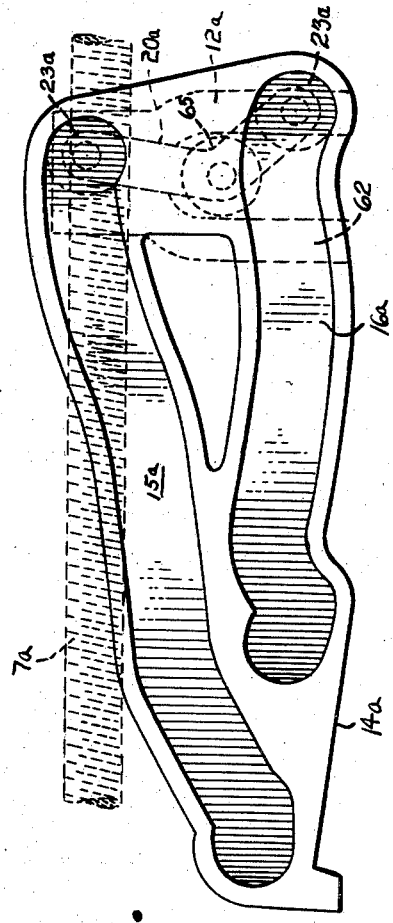
RAIMUNDO FERRER
INVENTOR.
BY Wenderoth, Lind & Ponack
ATTYS.

Dec. 9, 1958     R. FERRER     2,863,515
VEHICLE PARKING DEVICE
Filed July 9, 1957     4 Sheets-Sheet 4
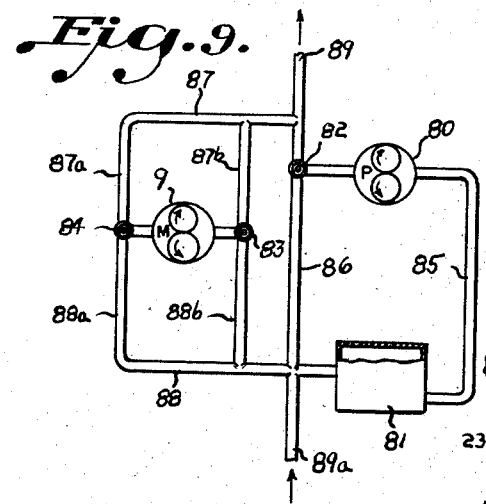
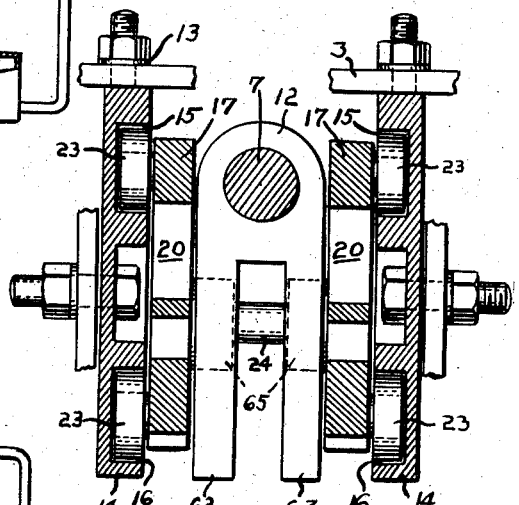
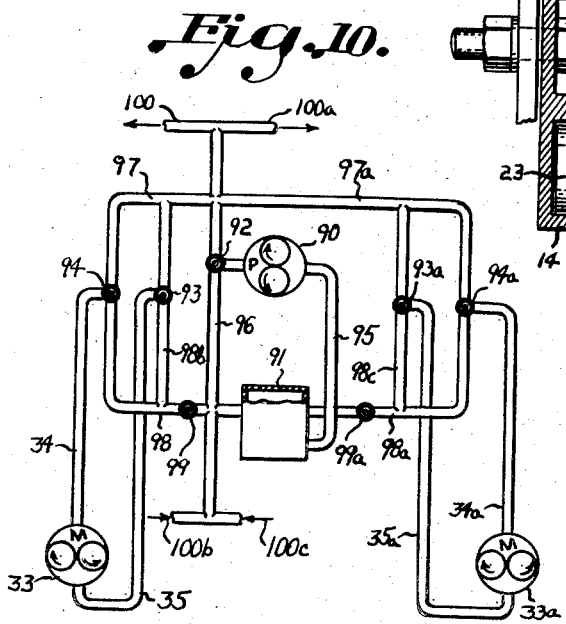
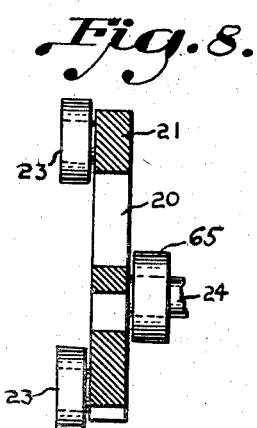
RAIMUNDO FERRER
INVENTOR.
BY Wenderoth, Lind & Ponack
ATTYS.

United States Patent Office 2,863,515
Patented Dec. 9, 1958

2,863,515

VEHICLE PARKING DEVICE

Raimundo Ferrer, Kohly, Marianao, Cuba

Application July 9, 1957, Serial No. 670,687

5 Claims. (Cl. 180—1)

The present invention relates to a device for installation beneath the front and rear ends of a vehicle chassis to facilitate parking in small spaces.

The problem of parking a motor vehicle in a small space relative to the over-all length of the motor vehicle is one that has vexed motor vehicle operators since the advent of such vehicles. It has been proposed to mount auxiliary wheels in various positions on the vehicle to permit movement of the vehicle laterally of its length as well as in the direction of its length. However, the proposed methods of mounting the auxiliary wheels have generally proved unsatisfactory from the standpoint of the strength of the device, which must be sufficient to support the full weight of the vehicle yet must not add an undue amount of weight thereto, and from the standpoint of the operation thereof, which must be simple and reliable, yet must not require expensive or complicated operating means. As a result of the drawbacks of previously proposed devices, parking devices of this nature have not come into general use.

It is an object of the present invention to provide a device having wheels thereon to be mounted beneath both the front and rear ends of a motor vehicle to facilitate movement of the vehicle in a direction laterally of its length which device overcomes the disadvantages of previous devices.

It is a further object of the present invention to provide a wheel device for mounting beneath the front and rear ends of a motor vehicle, which device may be lowered to raise the vehicle from its running wheels, and having means thereon to rotate the wheels of the device to move the vehicle laterally of its length.

It is a still further object of the present invention to provide a device for facilitating parking of a motor vehicle, which device may be mounted beneath the vehicle and which is strong and sturdy and which locks in the lowered position to prevent movement of the members of the device and collapse of the device.

Other and further objects of the invention will become apparent from the following specification taken together with the appended claims and the accompanying drawings in which:

Fig. 1 is a vehicle with a device according to the present invention mounted on the front and rear of the vehicle and shown in the lowered position;

Fig. 2 is a vehicle with a device according to the present invention mounted on the front and rear of the vehicle and shown in the raised position;

Fig. 3 is a side elevation of the device according to the invention in the raised position;

Fig. 4 is a side elevation, somewhat enlarged, of one of the wheel carrying frames in the lowered position;

Fig. 5 is an enlarged side elevation of the cam plate looking toward the grooves therein;

Fig. 6 is an end elevation view of the wheel carrying frame of Fig. 4;

Fig. 7 is an enlarged sectional view on line 7—7 of Fig. 3;

Fig. 8 is a detail of Fig. 7 showing the angle bearing of the wheel carrying frame with the cam rollers and bearing roller;

Fig. 9 is a diagramamtic representation of a hydraulic system for raising and lowering the wheel carrying frames of the device; and Fig. 10 is a diagrammatic representation of a hydraulic system for driving the wheels on the wheel carrying frames.

As seen in the figures, a vehicle 1 having four vehicle wheels 2 has mounted beneath the front and rear ends a vehicle parking device according to the invention. Only one of the devices will be described, the other being identical thereto. Further, the two halves of each of the devices are identical, the items designated by a being the counterparts of the elements designated by plain reference numerals, but being located on the opposite end of the device from the elements designated by plain numerals.

Bolted to the under side of the frame 3 of the vehicle by means of clamps 4 are spaced hangers 5 and 5a and 8 and 8a. Hangers 8 and 8a, being closest to the center of the vehicle, have mounted between them a hydraulic gear motor housing 38 within which is a hydraulic gear motor 9. Access to the interior of the housing 38 is gained through a port closed by plug 61.

Mounted between hangers 8 and 5 is a threaded spindle 7 and between hangers 5a and 8a a threaded spindle 7a. Bearings 6 and 6a rotatably mount spindles 7 and 7a in hangers 5 and 5a. The threaded spindles 7 and 7a are rotatably mounted in the hangers 8 and 8a in packings 10 and 10a which are held in position by packing nuts 11 and 11a. The spindles 7 and 7a are connected to hydraulic motor 9 for rotation thereby. They are rotated in opposite directions by the hydraulic motor 9.

Threadably mounted on the spindles 7 and 7a are two fork members 12 and 12a, each having two laterally spaced forks 62 and 63 which project downwardly from the spindles 7 and 7a.

Bolted to the vehicle frame 3 are two sets of support rods 13 and 13a to the free ends of which are secured opposed pairs of cam plates 14 and 14a. One of each pair of cam plates is positioned on each side of the fork members 12 and 12a. In the opposed faces of these cam plates are upper cam grooves 15 and 15a and lower cam grooves 16 and 16a.

Positioned between the opposed cam plates 14 and 14a are two wheel carrying frames 17 and 17a. Each of these wheel carrying frames is made up of two side frames 21, which are connected to each other and held in spaced relationship by a plurality of cross braces 22. A cover plate 26 is secured to the lower sides of the side frames 21.

Bolted to the outer ends of the wheel carrying frames 17 and 17a by means of bolts 64 are wheel mountings 18 and 18a which serve as housings for hydraulic gear motors 33 and 33a.

On the ends of the wheel carrying frames toward the center of the vehicle are pairs of angle bars 20 and 20a, each of which forms a part of one of the side frames 21. Rotatably mounted at the ends of angle bars 20 and 20a and facing outwardly of the wheel carrying frames 17 and 17a are cam rollers 23 and 23a, one of said cam rollers fitting into one of the upper cam grooves 15 in each of the cam plates 14 and 14a, and the other fitting into one of the corresponding lower cam grooves 16 on the cam plates. Rotatably mounted between pairs of angle bars 20 and 20a substantially midway of their length are bearing rollers 24 and 24a, the rollers 65 of which engage in the forks 62 and 63.

Suspended from the frame 3 by means of support rods 25 are two pairs of spaced hook members 27 and 27a, the hook members being disposed on each side of the wheel carrying frames 17 and 17a. Mounted on the wheel carrying frames are transverse support bars 28 and 28a, which in the raised position of the wheel carrying frames engage with hook members 27 and 27a to support the weight of the wheel carrying frames at the outer ends thereof.

An eye 29 is mounted on the lower end of each of the wheel carrying frames, and two springs 30 are secured to the eye. The springs extend along the length of the wheel carrying frame through apertures 26b in cover plate 26, and are there joined to cables 31 which run through cable guides 32 which project laterally from side frames 21 of the wheel carrying frames. Loops are formed in the ends of the cables 31 and are secured by cable clamps 60. These loops fit over portions of the frame 3 of the vehicle at points spaced from the ends of the wheel carrying frames 17 and 17a.

Hydraulic gear motors 33 and 33a are geared to axles 72 and 72a on which wheels 19 and 19a are mounted. Hydraulic fluid pressure lines 34 and 34a lead to one side of the motors 33 and 33a and hydraulic fluid pressure lines 35 and 35a lead to the other side of the hydraulic motors 33 and 33a.

A hydraulic system by which the spindles 7 and 7a are rotated and which may be mounted on the vehicle at any convenient location, is shown schematically in Fig. 9. The hydraulic gear motor 9 is supplied with hydraulic fluid under pressure from a hydraulic gear pump 80 through a supply pipe 87 with branches 87a and 87b to each side of the gear motor 9. The direction in which the fluid is fed to the hydraulic gear motor 9 is controlled by valve 82 in the output line from the pump 80, and valves 83 and 84 in the branches. A reservoir 81 is provided for the hydraulic fluid, and return line 88 with branches 88a and 88b connected to both sides of hydraulic gear motor 9 at valves 83 and 84 is connected into the reservoir. By-pass line 86 is provided between the valve 82 on the output line from the hydraulic pump 80 and the return line 88. Valve 82 permits diverting the fluid output of the hydraulic pump directly into the reservoir. Supply line 85 connects the reservoir to the intake side of the hydraulic pump 80. Motive power for the hydraulic pump 80 may be supplied by the auxiliary power system in the automotive vehicle.

The hydraulic system for operating the spindles 7 and 7a has been illustrated as applied to the device mounted on one end of the vehicle. A second system may be tied into this system for operating the device on the other end of the vehicle. There has been illustrated branch lines 89 and 89a to which the duplicate hydraulic system may be attached.

The hydraulic system for operating the hydraulic gear motors 33 and 33a is illustrated in Fig. 10. A hydraulic gear pump 90 is supplied from reservoir 91 through line 95. Supply pipes 97 and 97a are connected to the hydraulic gear motors 33 and 33a from the output side of hydraulic gear pump 90 through hydraulic fluid pressure lines 34, 34a, 35 and 35a. Valves 92, 93, 93a 94 and 94a control the direction in which the hydraulic fluid is pumped through the hydraulic gear motors 33 and 33a. Return lines 98 and 98a are provided with branches 98b and 98c connected to the hydraulic pressure lines 34, 34a, 35 and 35a at valves 93, 93a and 94 and 94a, the return lines leading directly into the reservoir 91. Blocking valves 99 and 99a are provided in the return lines 98 and 98a which serve to block the fluid from returning to the reservoir and thus block the hydraulic gear motors 33 and 33a. By-pass line 96 is provided between the output side of hydraulic gear pump 90 and the reservoir 91, and valve 92 is provided to divert the fluid output of the hydraulic gear pump 90 into the by-pass line 96. Duplicate systems may be attached to branch lines 100, 100a and 100b and 100c for operating the hydraulic gear motors on the device at the opposite end of the vehicle. As is the case with the hydraulic system for operating the hydraulic gear motor 12, power for operating the hydraulic gear pump 90 is provided from the auxiliary power system of the automotive vehicle, and the hydraulic system may be mounted at any convenient location on the vehicle.

In the operation of the device, the valve 82 is set to direct the fluid output of hydraulic gear pump 80 to the motor 9, and the valves 83 and 84 are set to direct the hydraulic fluid through gear motor 9 to rotate rotating spindles 7 and 7a. Rotation of the spindles 7 and 7a causes the fork members 12 and 12a to move outwardly along the spindles 7 and 7a. The bearing rollers 24 and 24a are thus moved outwardly, being carried along by fork members 12 and 12a. Cam rollers 23 and 23a are thus caused to roll in upper cam grooves 15 and lower cam grooves 16 in cam plates 14 and 14a. This causes the wheel carrying frames 17 and 17a to be moved according to the movement of the angle bars 20 and 20a to which the cam rollers and bearing rollers are attached. The shapes of the cam grooves 15 and 16 are such that the wheel carrying frames are first moved substantially laterally outwardly and slightly upwardly to lift support bars 28 and 28a from hook members 27 and 27a and to clear the support bars outwardly of the hook members. The wheel carrying frames 17 and 17a are then lowered and moved outwardly until they reach the fully lowered position, partially shown in dotted outline in the left-hand part of Fig. 3. At the extreme lowered position, the angle bars 20 and 20a, and consequently the wheel carrying frames 17 and 17a to which the angle bars are rigidly attached, will have rotated about the bearing rollers 24 and 24a from a substantially vertical position to a substantially horizontal position shown in dotted outline in Fig. 3. The fork members 12 and 12a will then be at the extreme outward ends of threaded spindles 7 and 7a. The spindles 7 and 7a acting on the fork members 12 and 12a will serve to hold the angle bars 20 and 20a in the substantially horizontal position, thus locking the wheel carrying frames 17 and 17a in the down position.

The springs 30 and cables 31 will have been extended to the position as shown in Fig. 6 in which they will serve to prevent lateral movement of the wheel carrying frames when they are in the lowered position.

Valve 82 may then be turned to direct the fluid output of the hydraulic gear pump into the by-pass line 86.

There is thus provided a rigid supporting structure for supporting the vehicle for lateral movement relative to its longitudinal direction.

If it is desired to move the vehicle laterally on the wheels 19 and 19a, the valve 92 is set to direct hydraulic fluid into the supply lines 97 and 97a, and the valves 93 and 93a and 94 and 94a are set to direct the hydraulic fluid through the gear motors 33 and 33a in the direction in which it is desired to turn the wheels for movement in the desired direction. When the desired movement has been completed, valves 99 and 99a may be closed, thus blocking any further movement of the hydraulic gear motors 33 and 33a and effectively braking further movement of the vehicle. Opening valves 99 and 99a and reversing valves 93 and 93a, 94 and 94a causes the wheels 71 and 71a to rotate in the opposite direction for lateral movement in the opposite direction.

Once the desired position of the vehicle has been achieved, valves 83 and 84 are reversed, and valve 82 is again set to direct hydraulic fluid into hydraulic gear motor 9. Hydraulic gear motor 9 will be rotated in the opposite direction, thus causing spindles 7 and 7a to rotate in the opposite direction and cause fork members 12 and 12a to move along spindles 7 and 7a toward the center of the vehicle. This retracts wheels 19 and 19a to the position originally occupied.

The cover plate 26 serves to keep the dirt out of the device when the wheel carrying frames are in the raised position. The cam plates 14 and 14a serve to close the sides of the device against entry of dirt, the cover plate 26 preventing entry of dirt from beneath the device.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A device for raising a wheeled vehicle from its wheels and mounted underneath at least one end of the wheeled vehicle, comprising two rotatable aligned threaded spindles, means between said spindles and connected thereto for driving said spindles in opposite directions, a fork member threadedly mounted on each of said spindles projecting downwardly therefrom, two pairs of cam means, the cam means of each pair mounted on opposite sides of each corresponding spindle, two wheel carrying frames, each of said wheel carrying frames being positioned between a corresponding pair of cam means and below the corresponding one of said spindles, a plurality of cam wheels on each of said wheel carrying frames, each cam wheel engaging the corresponding one of said cam means, a bearing roller on each of said wheel carrying frames, one bearing roller engaged with each of said fork members, wheel housings on the ends of each of said wheel carrying frames, wheels mounted on said housings, and means in said housings for driving said last mentioned wheels, whereby when said spindles are rotated, said fork members move along said spindles and said cam means guide said wheel carrying frames into their downwardly extended position.

2. A device for raising a wheeled vehicle from its wheels and mounted underneath at least one end of the wheeled vehicle, comprising two rotatable aligned threaded spindles, means between said spindles and connected thereto for driving said spindles in opposite directions, a fork member threadedly mounted on each of said spindles projecting downwardly therefrom, a pair of opposed cam plates mounted on opposite sides of each spindle, each plate having a plurality of cam grooves in the face thereof opposed to the other cam plate, two wheel carrying frames each having two spaced side frames and a plurality of cross braces connecting said side frames and holding them in spaced relationship, each of said wheel carrying frames being positioned between a corresponding pair of cam plates and below a corresponding one of said spindles, a plurality of cam wheels on each of said cam wheel carrying frames, each wheel engaging in a corresponding one of said grooves in said cam plates, a bearing roller on each of said wheel carrying frames, one bearing roller engaged with each of said fork members, wheel housings having wheel driving means therein mounted on the one end of each of said wheel carrying frames, means for driving said wheel driving means, and wheels mounted on said housings and connected to said wheel driving means to be driven thereby, whereby when said spindles are rotated, said fork members move along said spindles and said grooves in said cam plates guide said wheel carrying frames into their downwardly extended position.

3. A device for raising a wheeled vehicle from its wheels and mounted underneath at least one end of the wheeled vehicle, comprising two rotatable aligned threaded spindles, a hydraulic motor between said spindles and connected thereto for driving said spindles in opposite directions, a fork member threadedly mounted on each of said spindles and having two laterally spaced forks projecting downwardly therefrom, a pair of opposed cam plates mounted on opposite sides of each spindle, each plate having an upper and a lower cam groove in the face thereof opposed to the other cam plate, two wheel carrying frames each having two spaced side frames and a plurality of cross braces connecting said side frames and holding them in spaced relationship, each of said wheel carrying frames being positioned between a corresponding pair of cam plates and below a corresponding one of said spindles, a pair of angle bars on one end of each of said wheel carrying frames, each angle bar in said pairs forming part of a corresponding one of said side frames, a plurality of pairs of cam wheels, one pair of cam wheels on each angle bar, one cam wheel on each end of each angle bar and engaging in a corresponding one of said grooves in said cam plates, a bearing roller on each of said wheel carrying frames between angle bars in each pair of angle bars, said bearing roller having two roller parts thereon, one roller part engaged in a corresponding fork on the corresponding one of said fork members, wheel housings having hydraulic motors therein mounted on one end of each of said wheel carrying frames, means for driving said hydraulic motors, and wheels mounted on said housings and connected to said hydraulic motors to be driven thereby, whereby when said spindles are rotated, said fork members move along said spindles and carry said angle bars, and said grooves in said cam plates guide said wheel carrying frames into their downwardly extended position.

4. A device as claimed in claim 3 and a hook member mounted adjacent each wheel housing and supported by the vehicle frame, and a support bar on the end of each wheel carrying frame adjacent the wheel housing mounted thereon, said support bar extending transversely of the wheel carrying frame for engagement with said hook member when wheel carrying frame is in the raised position, said cam grooves having a shape causing said wheel carrying frames to move laterally outwardly of the vehicle and slightly upwardly before starting their downward movement.

5. A device as claimed in claim 3 and a plate between said side frames on each wheel carrying frame, said plate and said cam plates forming dust and dirt protectors for said device.

References Cited in the file of this patent

UNITED STATES PATENTS

| 1,764,486 | Woolley | June 17, 1930 |
| 1,896,118 | Wellensick | Feb. 7, 1933 |
| 2,762,442 | Delmas | Sept. 11, 1956 |